Patented Jan. 19, 1937

2,068,299

UNITED STATES PATENT OFFICE 2,068,299

PAPER ARTICLE AND METHOD OF MAKING SAME

George J. Manson, Hawkesbury, Ontario, Canada, assignor of one-half to Nathaniel L. Foster, New York, N. Y.

No Drawing. Application June 24, 1931, Serial No. 546,672

13 Claims. (Cl. 92—21)

This invention relates to paper products and to methods of producing the same, and also to compositions utilized in the manufacture of such paper products.

The preparation of laminated products comprising two or more sheets of paper cemented together by an adhesive, is carried out in the prior art by the use of asphalt emulsions or of straight asphalt as the binder or adhesive. Such asphalt emulsion or straight asphalt provides a binding layer between the plies of paper, which layer is impervious to moisture. Since, however, the asphalt emulsions or asphalt employed for such binders, is black or very dark in color, it is not possible to use the trim from the sheets of paper or board joined together by asphalt in the production of anything but a dark product. That is, when an attempt is made to reuse the trim from such laminated prior art products, due to the presence of the dark cementing material, the final product obtained by reuse of the trim is necessarily dark in color. Further, the asphalt material present in such trim is not as readily emulsified or broken up in beating operations as is desirable.

Among the objects of the present invention is the production of light-colored adhesives utilizable as the binder or cementing agent in the production of laminated products, such as laminated paper board, which adhesives are readily disintegrated in beating operations, particularly in the presence of alkali.

A further object of the present invention is the production of laminated paper products utilizing the adhesives referred to above.

A still further object of the present invention includes the production of paper products from beaten trim of the laminated materials referred to above.

Still further and other objects and advantages will appear from the more detailed description set forth below, it being understood however that this more detailed description is given by way of explanation and illustration only, and not by way of limitation, since various changes may be made in that more detailed description by those skilled in the art, without departing from the scope and spirit of the present invention.

The present invention is thus concerned with the production of laminated products, particularly the type consisting of two or more plies of paper material cemented together by adhesives or binding or cementing agents. In accordance with the present invention such adhesives are used which are light-colored, and which are sufficiently moistureproof, to render the laminated product resistant to the passage of atmospheric moisture. While the adhesive thus employed is sufficiently moistureproof in its use in these laminated products, it is constituted of materials that are readily disintegrated during beating operations as in beaters employed in paper manufacture, so that the trim from such laminated products which has heretofore in the art been a relatively waste product and utilizable only in the production of dark-colored paper, may be re-utilized when such trim is obtained from the laminated products produced in accordance with the present invention, and such reconstituted trim enabling sheeted materials of light color to be readily obtained.

Exemplary of the light-colored adhesive compositions employed in accordance with the present invention, there is utilized as the basic material for such adhesives, a saponifiable natural resin, that is a resin of acidic nature of which rosin is exemplary. The resinous component of the adhesive constitutes the bulk thereof, the resin being compounded with oils selected from the group including the mineral oils and the glyceride oils, such as the animal and vegetable oils. The oil components of the composition constitute but a minor proportion of the total composition, so that the composition will exhibit pronounced adhesive properties in producing the laminated products. The oil component of the composition, although relatively minor in proportion, yields valuable moisture-resisting properties to the composition, while the major proportion of the composition being the resin, the composition possesses pronounced adhesive properties, but at the same time is capable of being readily disintegrated during beating operations, particularly in the presence of alkali. Such compositions also have light color which particularly adapt them for the purposes in hand. While rosin has been given above as the preferred type of natural resin, other natural resins of acidic character yielding saponifiable compositions may readily be employed. The oil component may be either of the mineral oil type or of the glyceride oil type, or in the preferred instance, the composition will include both types of oils, the glyceride oil being the minor amount of the oil component. Of the mineral and hydrocarbon oils, a preferred exemplary constituent is Russian petroleum or other mineral hydrocarbons that have the general physical characteristics of Russian petroleum. The glyceride oils include both the animal and vegetable oils, and while drying oils are preferred, the semi-drying and non-drying vegetable and animal oils may also be utilized.

In order that the composition have the desired pronounced adhesive properties, it is preferred that the resin content include from 70–80% of resin, the remainder constituting the oil component, and when both mineral and glyceride oils are present, the glyceride oil constitutes but a minor amount of the total oil component. A preferred example of such light-colored adhesive includes 70–80% rosin, Russian petroleum, and a small amount of linseed oil.

These light-colored adhesives produced in accordance with the description given above are particularly important in producing laminated materials, as for example by cementing together two or more plies of paper by means of these adhesives. A laminated paper product is thus obtained which offers adequate resistance to moisture, but the nature of the adhesive enables the trim from such laminated products to be readily reconstituted into a pulp material by treatment in a paper beater, particularly in the presence of alkali.

Such trim is readily disintegrated in the beating operation, and a pulp material is obtained that may be sheeted on ordinary paper-making or board-making machines. Due to the fact that the reconstituted pulp is obtained from the trim resulting in the production of the laminated materials, and containing adhesives that are light colored, the resulting reconstituted pulp from such trim is light in color and enables light-colored sheeted materials to be obtained.

For example, paper containing the rosin moisture proofing layer may be readily worked up in the beater by the use of sufficient alkali to saponify the rosin. As the adhesive is but a small percentage of the total weight of the paper, only a small amount of alkali is required during the beating operation.

Examples of adhesives utilizable for the purposes hereinabove set forth are given below:

Example I

| | |
|---|---|
| Rosin | gms__ 100 |
| Oleic acid | cc__ 42 |

Example II

| | |
|---|---|
| Rosin | gms__ 100 |
| Mineral oil | cc__ 33 |

Example III

| | |
|---|---|
| Rosin | gms__ 100 |
| Linseed oil | cc__ 20 |

Example IV

| | |
|---|---|
| Rosin | gms__ 100 |
| Linseed oil | cc__ 10 |
| Oleic acid | cc__ 20 |

These adhesives of the present invention are suggested primarily for adhesives in preparing laminated material as the binder between such laminated layers for which purpose they are eminently suited. While they are not particularly suggested for outer protective coatings on articles, their resistance to atmospheric moisture is sufficient for use as the binder in laminated products and for related purposes.

Having thus set forth my invention, I claim:

1. In a process of producing paper products, the step which comprises beating trim of a laminated material carrying a light-colored adhesive consisting of a saponifiable natural resin, and an oil selected from the group consisting of mineral and glyceride oils to produce a light-colored such a matrix is called a "positive real" matrix. the adhesive components from the trim, and capable of being sheeted on a paper making machine.

2. In a process of producing paper products, the step which comprises beating trim of a laminated material carrying a light-colored adhesive consisting of a saponifiable resin, and an oil selected from the group consisting of mineral and glyceride oils, in the presence of an alkali to saponify the adhesive to produce a light-colored reconstituted pulp containing substantially all of the adhesive components from the trim, and capable of being sheeted on a paper making machine.

3. In a process of producing paper products, the step which comprises beating trim of a laminated material carrying a light-colored adhesive consisting of 70–80% rosin, a mineral oil having the characteristics of Russian petroleum, and a small amount of linseed oil to produce a light-colored reconstituted pulp containing substantially all of the adhesive components from the trim, and capable of being sheeted on a paper making machine.

4. In a process of producing paper products, the steps which include beating trim of a laminated material carrying a light-colored adhesive consisting of a saponifiable natural resin, and an oil selected from the group consisting of mineral and glyceride oils to produce a light-colored reconstituted pulp containing substantially all of the adhesive components from the trim, and capable of being sheeted on a paper making machine, and sheeting the beaten trim.

5. In a process of producing paper products, the steps which comprise beating trim of a laminated material carrying a light-colored adhesive consisting of 70–80% rosin, a mineral oil having the characteristics of Russian petroleum, and a small amount of linseed oil, and sheeting the beaten trim.

6. An article of manufacture comprising a laminated product, the plies of which are rigidly cemented together by a light-colored adhesive consisting of a saponifiable natural resin and an oil selected from the group consisting of mineral and glyceride oils, the amount of resin in the composition being sufficient to give the composition pronounced adhesive properties.

7. An article of manufacture comprising a laminated paper board made of plies of paper rigidly cemented together by a light-colored adhesive consisting of a saponifiable natural resin and an oil selected from the group consisting of mineral and glyceride oils, the amount of resin in the composition being sufficient to give the composition pronounced adhesive properties.

8. An article of manufacture comprising a laminated paper board made of plies of paper rigidly cemented together by a light-colored adhesive consisting of a saponifiable natural resin and a small amount of a drying oil, the amount of resin in the composition being sufficient to give the composition pronounced adhesive properties.

9. An article of manufacture comprising a laminated paper board made of plies of paper cemented together by a light-colored adhesive consisting of 70–80% rosin, a mineral oil having the characteristics of Russian petroleum, and a small amount of linseed oil.

10. A paper product comprising beaten trim of a laminated paper material carrying a cementing agent consisting of a light-colored adhesive made of a saponifiable natural resin and an oil selected from the group consisting of mineral and glyceride oils.

11. A paper product comprising beaten trim of a laminated paper material carrying a light-colored cementing agent consisting of 70–80% rosin, a mineral oil having the characteristics of Russian petroleum, and a small amount of linseed oil.

12. In a process of producing light colored, moisture resistant, readily disintegrable, laminated paper products, the steps which include beating moisture resistant, readily disintegrable trim of a laminated material carrying a light-colored adhesive consisting of a saponifiable natural resin, and an oil selected from the group consisting of mineral and glyceride oils, sheeting the beaten trim, and forming a moisture resistant, readily disintegrable laminated board from said sheeted beaten trim by cementing at least two sheets thereof together by a light colored adhesive consisting of a saponifiable natural resin and an oil selected from the group consisting of mineral and glyceride oils.

13. In a process of producing light colored, moisture resistant, readily disintegrable, laminated paper products, the steps which include beating moisture resistant, readily disintegrable trim of a laminated material carrying a light colored adhesive consisting of a saponifiable natural resin, and an oil selected from the group consisting of mineral and glyceride oils, in the presence of an alkali to saponify the adhesive, sheeting the beaten trim, and forming a moisture resistant, readily disintegrable laminated board from said sheeted beaten trim by cementing at least two sheets thereof together by a light colored adhesive consisting of a saponifiable resin and an oil selected from the group consisting of mineral and glyceride oils.

GEO. J. MANSON.